(12) United States Patent
Rosser, Jr.

(10) Patent No.: US 6,303,022 B1
(45) Date of Patent: *Oct. 16, 2001

(54) METHOD OF GAS STREAM PURIFICATION HAVING INDEPENDENT VAPOR AND LIQUID REFRIGERATION USING A SINGLE REFRIGERANT

(75) Inventor: Frank S. Rosser, Jr., La Grange Park, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/378,801

(22) Filed: Aug. 23, 1999

Related U.S. Application Data

(63) Continuation-in-part of application No. 08/907,729, filed on Aug. 8, 1997, now Pat. No. 5,965,014.

(51) Int. Cl.[7] .............................. C10G 5/04; C10G 5/06
(52) U.S. Cl. ............................ 208/340; 208/95; 208/101; 208/134; 208/341; 208/343
(58) Field of Search ............................ 208/95, 101, 134, 208/340, 341, 343

(56) References Cited

U.S. PATENT DOCUMENTS

| | | | |
|---|---|---|---|
| 2,939,834 | 6/1960 | Evans | 208/101 |
| 3,444,072 | 5/1969 | Lehman | 208/102 |
| 3,520,799 | 7/1970 | Forbes | 208/101 |
| 3,520,800 | 7/1970 | Forbes | 208/101 |
| 3,770,622 | 11/1973 | Freierich et al. | 208/340 |
| 3,882,014 | 5/1975 | Monday et al. | 208/134 |
| 4,009,097 | 2/1977 | Ward | 208/342 |
| 4,333,817 | 6/1982 | O'Brien | 208/101 |
| 4,333,818 | 6/1982 | Coste | 208/101 |
| 4,333,819 | 6/1982 | Scheifele, Jr. | 208/101 |
| 4,333,820 | 6/1982 | Scheifele, Jr. | 208/101 |
| 4,364,820 | 12/1982 | DeGraff et al. | 208/101 |
| 4,374,726 | 2/1983 | Schmelzer et al. | 208/101 |
| 4,735,704 | 4/1988 | Kister et al. | 208/100 |
| 5,178,751 | 1/1993 | Pappas | 208/340 |
| 5,238,555 | 8/1993 | Pappas et al. | 208/340 |
| 5,965,014 | * 10/1999 | Rosser, Jr. | 208/340 |

\* cited by examiner

*Primary Examiner*—Walter D. Griffin
(74) *Attorney, Agent, or Firm*—John G. Tolomei; James C. Paschall

(57) ABSTRACT

A process for recovering a hydrogen-rich gas and for increasing the recovery of liquid hydrocarbon products from a hydrocarbon conversion zone effluent by adsorption of the liquifiable products from a chilled gaseous stream with a chilled liquid stream is improved by an arrangement that uses a single refrigeration shell to provide independent temperature control of the chilled gaseous and the chilled liquid stream.

10 Claims, 1 Drawing Sheet

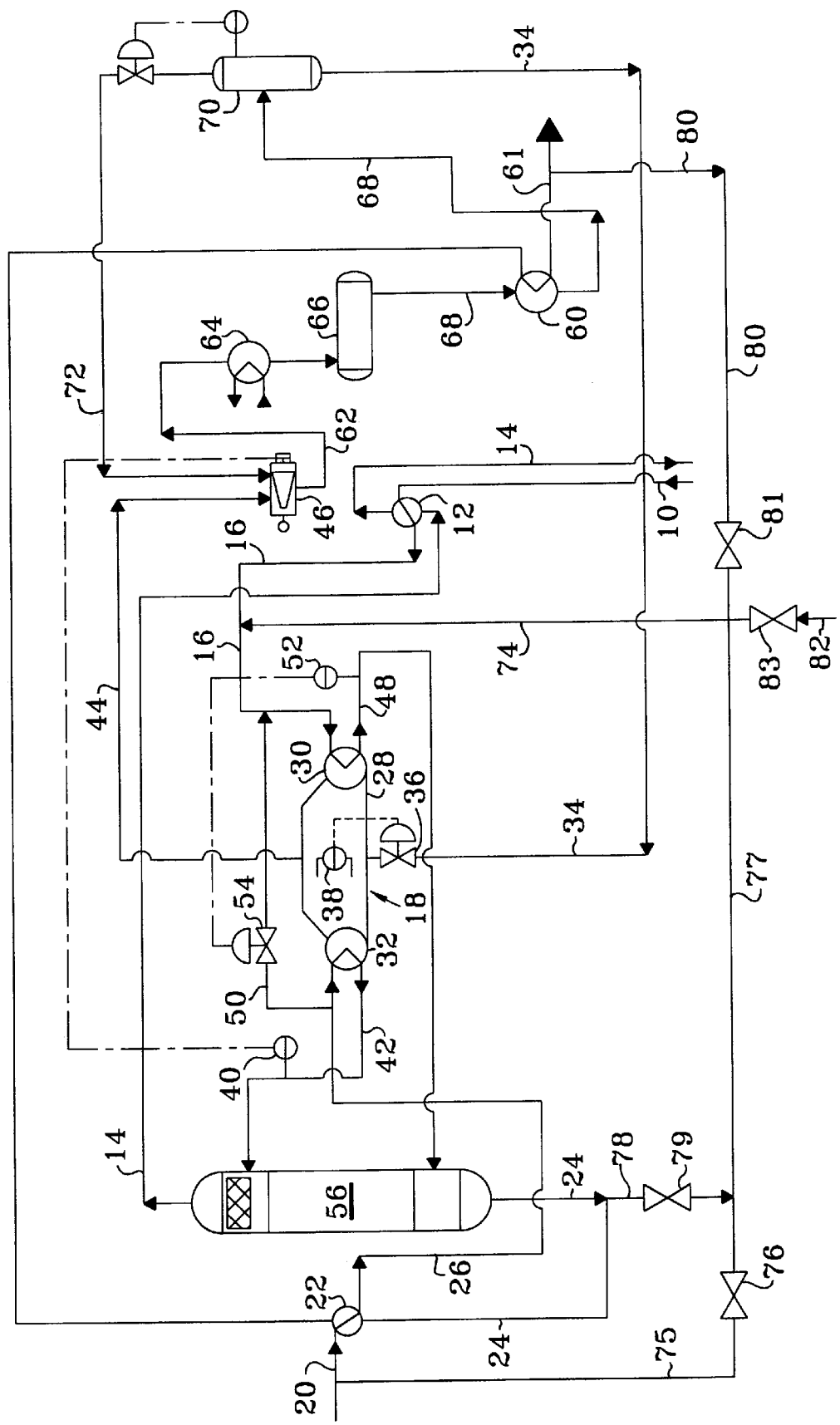

METHOD OF GAS STREAM PURIFICATION HAVING INDEPENDENT VAPOR AND LIQUID REFRIGERATION USING A SINGLE REFRIGERANT

CROSS REFERENCE TO RELATED APPLICATION

This application is a continuation in part of allowed U.S. Ser. No. 08/907,729 filed Aug. 8, 1997 now U.S. Pat. No. 5,965,014.

FIELD OF THE INVENTION

The present invention is related to methods for recovering liquifiable hydrocarbons from light hydrocarbon gas streams by refrigeration and absorption using a liquid hydrocarbon-containing stream. Typically, the liquifiable hydrocarbons are present in a hydrogen-containing stream.

BACKGROUND OF THE INVENTION

Various types of catalytic hydrocarbon conversion reaction systems have found widespread utilization throughout the petroleum and petrochemical industries for effecting the conversion of hydrocarbons to different products. The reactions employed in such systems are either exothermic or endothermic and, of more importance to the present invention, often result in either the net production of hydrogen or the net consumption of hydrogen. Typical of the net hydrogen-producing hydrocarbon reaction systems are catalytic reforming, catalytic dehydrogenation of alkylaromatics, and catalytic dehydrogenation of paraffins. Commonly employed net hydrogen-consuming reaction systems are hydrotreating, hydrocracking, and catalytic hydrogenation. Of the above-mention net hydrogen-producing and consuming hydrocarbon reaction systems, catalytic reforming ranks as one of the most widely employed.

With the operation of net hydrogen producing processes the hydrogen balance for the petroleum refinery or petrochemical complex may result in excess hydrogen, i.e., the net hydrogen-producing reaction systems produce more hydrogen than is necessary for the net hydrogen-consuming reaction systems. In such an event, the excess hydrogen may be sent to the petroleum refinery or petrochemical complex fuel system. However, because the excess hydrogen often has admixed therewith valuable components such as $C_3+$ hydrocarbons, it is frequently desirable to recover the three components by treating the excess hydrogen prior to its passage to fuel.

Because hydrogen is relatively expensive, it has become the practice within the art of hydrocarbon conversion to supply hydrogen from reaction systems which result in the net production of hydrogen to reaction systems which are net consumers of hydrogen. Occasionally, the net hydrogen being passed to the net hydrogen-consuming reactions systems must be of high purity due to the reaction conditions and/or the catalyst employed in the systems. Such a situation may require treatment of the hydrogen from the net hydrogen-producing reaction systems to remove hydrogen sulfide, light hydrocarbons, etc. from the net hydrogen stream.

It is well known that high quality petroleum products in the gasoline boiling range, including—for example— aromatic hydrocarbons such as benzene, toluene, and the xylenes, are produced by the catalytic reforming process wherein a naphtha fraction is passed to a reaction zone wherein it is contacted with a platinum-containing catalyst in the presence of hydrogen. By virtue of its wide application and its utilization as a primary source of hydrogen for the net hydrogen-consuming reactions systems, catalytic reforming has become well known in the art of hydrocarbon conversion reaction systems. Generally, the catalytic reforming reaction zone effluent comprising gasoline boiling range hydrocarbons and hydrogen is passed to a vapor-liquid equilibrium separation zone and is therein separated into a hydrogen-containing vapor phase and an unstabilized hydrocarbon liquid phase. A portion of the hydrogen-containing vapor phase may be recycled to the reaction zone. The remaining hydrogen-containing vapor phase is available for use either by the net hydrogen-consuming processes or as fuel for the petroleum refinery or petrochemical complex fuel system. While a considerable portion of the hydrogen-containing vapor phase is required for recycle purposes, a substantial net excess is available for the other uses.

Because the dehydrogenation of naphthenic hydrocarbons is one of the predominant reactions of the reforming process, substantial amounts of hydrogen are generated within the catalytic reforming reaction zone. Accordingly, a net excess of hydrogen is available for use as fuel or for use in a net hydrogen-consuming process such as the hydrotreating of sulfur-containing petroleum feedstocks. However, catalytic reforming also involves a hydrocracking function among the products of which are relatively low molecular weight hydrocarbons including methane, ethane, propane, butanes and the pentanes; substantial amounts of which appear in the hydrogen-containing vapor phase separated from the reforming reaction zone effluent. These normally gaseous hydrocarbons have the effect of lowering the hydrogen purity of the hydrogen-containing vapor phase to the extent that purification is often required before the hydrogen is suitable for other uses. Moreover, if the net excess hydrogen is intended for use as fuel in the refinery or petrochemical complex fuel system, it is frequently desirable to maximize the recovery of $C_3+$ hydrocarbons which are valuable as feedstock for other processes.

Many processes for the purification of hydrogen-rich gas streams from the effluent of hydrocarbon conversion reaction zones are disclosed. Well known processing procedures for hydrogen-containing effluent streams include steps to remove potentially valuable $C_3+$ product hydrocarbons from hydrogen-containing gas streams. U.S. Pat. No. 5,238,555, issued Aug. 24, 1993, discloses a process wherein the effluent from a reforming zone is separated into a hydrogen containing stream and a hydrocarbon effluent. Both streams are chilled and the chilled streams are contacted to absorb lighter hydrocarbons from the hydrogen-containing stream. U.S. Pat. No. 5,178,751 shows another arrangement for separating light hydrocarbons from a chilled hydrogen-containing stream recovered from a reforming zone using a chilled hydrogen stream. In U.S. Pat. No. 5,178,751 the hydrogen-containing stream and the hydrocarbon steam are admixed and chilled together in a single chiller, but the admixture of the streams precludes any independent control of the temperature of the gas and liquid phases.

SUMMARY OF THE INVENTION

This invention is a refrigeration method for the recovery of hydrocarbons from light gas streams by the adsorption of light hydrocarbons from a chilled hydrocarbon stream using a chilled liquid phase hydrocarbon stream wherein the method independently controls the temperature of both phase streams in a single refrigeration chiller. The invention uses a chiller with a single shell, a single refrigerant, and two exchanger sections to independently chill both streams in the single shell. The temperature of the liquid phase stream is controlled by adjusting the loading of the refrigeration compressor. The method diverts a small amount of the liquid phase stream into the gas phase stream before the gas phase stream enters the chiller to adjust the temperature of the chilled gas phase.

This arrangement confers numerous equipment and process benefits to the method of recovering the hydrocarbon streams. Costs are reduced by having the vapor and liquid exchanger bundle share a common shell for indirect contact with the refrigerant. The invention also eliminates the need for duplicate refrigeration expansion valves and other control systems such as duplicate refrigerant level controls and large pressure valves for regulating refrigerant vapor to the compressor suction line. The addition of a small amount of the liquid phase to adjust the temperature of the vapor phase has the added process advantage of providing another partial stage of adsorption prior to the gas phase stream entering the adsorber column. Therefore, the overall efficiency of the system is improved by the method while providing the significant capital cost savings.

Accordingly, in one embodiment, this invention is a method for recovering liquifiable hydrocarbons from a gas stream by chilling the gas stream and absorbing the liquifiable hydrocarbons with a chilled liquid stream. The liquid chiller feed is passed to a chiller having a single shell that retains exchanger sections for gas and liquid. The liquid chiller feed is then indirectly contacted with the refrigerant in the chiller to produce an absorber liquid. The gas stream is mixed with a control stream, preferably a bypass stream of the liquid chiller feed, to produce a gaseous chiller feed that enters a gas heat exchange section in the chiller separately from the liquid chiller feed. Any hydrocarbon stream with a principally liquid phase can supply the control stream. The gaseous chiller feed is indirectly contacted with the refrigerant in the chiller to produce a chilled gaseous stream. The chilled gaseous stream and the absorber liquid contact each other in an absorber. An absorber gas having a reduced quantity of liquifiable hydrocarbons and a liquid phase absorber effluent are recovered from the absorber. The temperature of the chilled gaseous stream is adjusted by varying the amount of the control stream that is combined with the gaseous stream. The quantity of the control stream combined with the gaseous stream may comprise 1 to 25 wt % of the liquid stream and, more preferably, 1 to 10 wt % of the liquid stream.

From the following detailed description of the invention, additional details and advantages of this invention can be appreciated by those skilled in the art.

BRIEF DESCRIPTION OF THE DRAWING

The FIGURE is a schematic flow diagram for the recovery of liquifiable hydrocarbons from separate vapor and liquid streams containing the hydrocarbons.

DETAILED DESCRIPTION OF THE INVENTION

The basic requirements for the operation of this process are a gas stream that contains light hydrocarbons that can be recovered by establishing a new vapor liquid equilibrium through temperature reduction and a normally liquid hydrocarbon stream for absorption of the light hydrocarbons. The light hydrocarbons are generally referred to herein as liquifiable hydrocarbons and will comprise mainly $C_3$ paraffinic hydrocarbons. The normally liquid hydrocarbon stream will typically contain $C_4$ and heavier hydrocarbons. The gaseous and liquid streams may be obtained from any source, but are most typically obtained as separate fractions from a hydrogen producing process. The control stream for combination with the gaseous stream may be an integral stream in the absorption and refrigeration arrangement or may be imported in the process from any convenient source.

Hydrocarbon conversion processes that produce suitable effluents for use in this invention typically comprise catalytic reforming, catalytic dehydrogenation, catalytic isomerization. Although it is not a requirement of this invention, hydrogen will usually make up a majority of the light gas stream. The other portion of the light gas stream will comprise other relatively uncondensible hydrocarbons such as methane and ethane. The invention is most useful when the quantity of liquifiable hydrocarbons in the gas stream is relatively high—say in a range of from 15% to 8%, but it is still effective for liquifiable hydrocarbon concentrations as low as 5%. A majority of liquid hydrocarbon streams entering the process will comprise $C_5$ and heavier hydrocarbons.

In regard to refrigeration, the invention can use any refrigeration system that has two independent heat exchange sections or bundles in a single shell for separately cooling both the gas and liquid streams with the same refrigerant. Accordingly the single shell refers to a single enclosure or containment vessel for circulating the refrigerant that contacts the independent heat exchange elements for the gaseous and liquid phase streams. For example, a simple cycle comprising refrigerant evaporators, compressor, condenser, and expansion valve can suffice or if desired, a more complex cascade system may be employed to cool the heat exchange sections in the shell. The refrigeration section can include any shell design for the evaporators that will accommodate separate tube sections for the individual chilling of liquid and vapor streams. This will include shell types with opposing "U" bundles or with head types that will allow for divided flow in fixed or removable tubes sheets. The performance of the evaporator may also benefit from the incorporation of an enhanced boiling surface on the boiling surface of the tubes.

The exact nature and configuration of the refrigeration scheme is dependent on the desired temperature of the refrigerated admixture and in turn that temperature is dependent on the composition of the admixture and the desired purity of the gaseous stream. The temperature of the refrigerated admixture may broadly be in a range of from −30 to 45° F. In the case of a hydrogen-containing gas stream, the temperature should be as low as possible with some margin of safety to prevent freezing. Generally, the refrigeration temperature will be from about −30 to 42°. In addition, it should be noted that the exact desired temperature of the refrigerated admixture will determine whether drying of the gaseous phase is necessary in order to avoid ice formation within the refrigeration heat exchanger and the concomitant reduction in heat transfer coefficient accompanied therewith. For catalytic reforming, refrigerated admixture temperatures in the range of −20 to 42° F. are usually suitable without the necessity of drying the hydrogen-containing vapor phase. This temperature will vary with the water content of the hydrogen-containing vapor phase.

If drying is required, it may be effected by any means known in the art. Absorption using liquid desiccants such as ethylene glycol, diethylene glycol, and triethylene glycol may be advantageously employed. In such an absorption system, a glycol desiccant is contacted with the hydrogen-containing vapor phase in an absorber column. Water-rich glycol is then removed from the absorber and passed to a regenerator wherein the water is removed from the glycol desiccant by application of heat. The resulting lean glycol desiccant is then recycled to the absorber column for further use. As an alternative to absorption using liquid desiccants, drying may also be effected by adsorption utilizing a solid desiccant. Alumina, silica gel, silica-alumina beads, and molecular sieves are typical of the solid desiccants which may be employed. Generally, the solid desiccant will be placed in at least two beds in a parallel flow configuration. While the hydrogen-containing vapor phase is passed through one bed of desiccant, the remaining bed or beds are regenerated. Regeneration is generally effected by heating to remove desorbed water and purging the desorbed water vapor from the desiccant bed. The beds of desiccant may, therefore, be cyclically alternated between drying and regeneration to provide continuous removal of water from the hydrogen-containing vapor phase.

While not specifically limited thereto, this invention is highly useful in treating the effluent from a catalytic reforming process. The further description of this invention in the context of reforming process is not meant to limit the application of this invention to any particular process.

The art of catalytic reforming is well known to the petroleum refining and petrochemical processing industry. Accordingly, a detailed description thereof is not required herein. In brief, the catalytic reforming art is largely concerned with the treatment of a petroleum gasoline fraction to improve its anti-knock characteristics. The petroleum fraction may be a full boiling range gasoline fraction having an initial boiling point of from about 50 to about 100° F. and an end boiling point from about 325 to about 425° F. More frequently, the gasoline fraction will have an initial boiling point of about 150 to about 250° F. and an end boiling point of from about 350 to 425° F., this higher boiling fraction being commonly referred to as naphtha. The reforming process is particularly applicable to the treatment of those straight-run gasolines comprising relatively large concentrations of naphthenic and substantially straight-chain paraffinic hydrocarbons which are amenable to aromatization through dehydrogenation and/or cyclization. Various other concomitant reactions also occur, such as isomerization and hydrogen transfer, which are beneficial in upgrading the anti-knock properties of the selected gasoline fraction. In addition to improving the anti-knock characteristics of the gasoline fraction, the tendency of the process to produce aromatics from naphthenic and paraffinic hydrocarbons makes catalytic reforming an invaluable source for the production of benzene, toluene, and xylenes which are all of great utility in the petrochemical industry.

Widely accepted catalysts for use in the reforming process typically comprise platinum on an alumina support. These catalysts will generally contain from about 0.05 about 5 wt. % platinum. Certain promoters or modifiers such as cobalt, nickel, rhenium, germanium, and tin have been incorporated into the reforming catalyst to enhance its performance.

The catalytic reforming of naphtha boiling range hydrocarbons, a vapor phase operation, is effected at conversion conditions which include catalyst bed temperatures in the range of from about 700 to about 1020° F. Other conditions generally include a pressure of from about 20 to about 1000 psig, a liquid hourly space velocity (defined as volumes of fresh charge stock per hour per volume of catalyst particles in the reaction zone) of from about 0.2 to about 10 hr.$^{-1}$, and a hydrogen to hydrocarbon mole ratio generally in the range of from about 0.5:1 to about 10:1.

The catalytic reforming reaction is carried out at the aforementioned reforming conditions in a reaction zone comprising either a fixed or a moving catalyst bed. Usually, the reaction zone will comprise a plurality of catalyst beds, commonly referred to as stages. The catalyst beds may be stacked and enclosed within a single reactor vessel, or the catalyst beds may each be enclosed in a separate reactor vessel in a side-by-side reactor arrangement.

Upon removal of the hydrocarbon and hydrogen effluent from the catalytic reaction zone, it is customarily subjected to indirect heat exchange typically with the hydrogen and hydrocarbon feed to the catalytic reaction zone. Such an indirect heat exchange aids in the further processing of the reaction zone effluent by cooling it and recovers heat which would otherwise be lost for further use in the catalytic reforming process. Following any such cooling step which may be employed, the reaction zone effluent is passed to a vapor-liquid equilibrium separation zone to recover the hydrogen-containing vapor phase from the effluent, at least a portion of which is to be recycled back to the reforming zone. The vapor-liquid equilibrium separation zone is usually maintained at substantially the same pressure as employed in the reforming reaction zone, allowing for the pressure drop in the system. The temperature within the vapor-liquid equilibrium separation zone is typically maintained at about 60 to about 120° F. The temperature and pressure are selected in order to produce a hydrogen-containing containing vapor phase and a principally liquid phase comprising unstabilized reformate.

As noted previously, the catalytic reforming process generally requires the presence of hydrogen within the reaction zone. Although this hydrogen may come from any suitable source, it has become the common practice to recycle a portion of the hydrogen-containing vapor phase derived from the vapor-liquid equilibrium separation zone to provide at least part of the hydrogen required to assure proper functioning of the catalytic reforming process. The balance of the hydrogen-containing vapor phase is therefore available for use elsewhere. As noted above, a principally liquid phase comprising unstabilized reformate is withdrawn from the first vapor-liquid equilibrium separation zone. Pursuant to the invention, a portion of this unstabilized liquid reformate comprising from about 20 to 75 vol. % of the total reformate is passed to a heat exchange means for indirect heat exchange with a hereinafter defined second unstabilized liquid reformate.

The recovery of hydrocarbons from the gas phase stream is effected in this invention in a manner generally depicted by the FIGURE. Details such as pumps, valves, and other equipment associated with the operation of a refrigeration section have been omitted, but are well known to those skilled in the art. The depiction of this invention by the particular arrangement shown in the FIGURE is not meant to limit the invention to the details shown therein.

The gaseous stream enters the process through a line 10 and undergoes indirect heat exchange in heat exchanger 12 against the gaseous effluent leaving the process via line 14. The chilled gas stream passes via line 16 to a chiller 18. A normally liquid stream enters the process via line 20 and is heat exchanged in an exchanger 22 against a liquid stream carried by a line 24. A line 26 transfers the cooled liquid to the chiller 18. Heat exchange of the hydrogen-containing vapor phase with the hydrogen-rich vapor phase pre-cools the hydrogen-containing vapor phase before it is chilled in accordance with this invention and passed to an absorption zone. The heat exchanger 12 will typically lower the temperature of the hydrogen-containing vapor phase to a temperature of 60 to 20° F. and the refrigeration will further lower its temperature to 42 to −20° F. Similarly, heat exchange of the liquid hydrocarbon stream 20 from with the liquid product stream 24 precools the liquid hydrocarbons stream that is chilled in the common refrigeration zone of this invention and passed to the absorption zone. The heat exchange raises the temperature of the cooled liquid product stream 24 to a temperature of 60 to 80° F. The refrigeration lowers the temperature of the liquid stream to a temperature of between 42 to −20° F.

As will readily be recognized by the practitioner, upon pre-cooling a small portion of the hydrogen-containing vapor phase may condense; however, it is to be understood that the term "hydrogen-containing vapor phase" as used herein is intended to include that small condensed portion. Hence, the entire hydrogen-containing vapor phase including any portion thereof condensed upon pre-cooling is admixed with the unstabilized liquid reformate.

Chiller 18 has a single shell 28 that indirectly heat exchanges the gas stream in a heat exchange section 30 and a liquid stream in a heat exchange section 32. A line 34 supplies a refrigerant to the shell 28 for heat exchange with both the gas phase and the liquid phase streams. A control valve 36 regulates the amount of refrigerant entering the heat exchange shell 28 in response to a level sensor 38. Refrigerant from chiller 18 passes via a line 44 to a compressor 46.

The overall temperature of the refrigerant entering shell 28 via line 34 is controlled through a temperature sensor 40 that detects the temperature of the refrigerated liquid leaving the chiller. The refrigerated liquid leaves chiller 18 in a line 42 in which sensor 40 is located. Signals from temperature detector 40 are used to control the operation of compressor 46 and the temperature of the refrigerant entering shell 18 for direct control of the refrigerated liquid temperature.

The refrigerated gas stream exits chiller 18 via a line 48. Independent temperature control of the refrigerated gas stream can be provided from a number of streams. The drawing shows a bypass line 50 as one method of delivering the control stream by direct division from the liquid stream just before it enters the liquid heat exchange section 32. In this arrangement a temperature sensor 52 detects the temperature of the refrigerated gas stream in line 48 and regulates the amount of liquid bypassed into line 16 via control valve 54.

The refrigerated liquid and refrigerated gas streams from chiller 18 pass to absorber column 56. Refrigerated liquid from line 42 descends in counter current contact with the upwardly flowing gas stream from line 48. Contact with the chilled liquid adsorbs light hydrocarbons from the chilled gas stream. The absorption zone is of an ordinary design and typically is arranged as a vertical column with internals for promoting liquid to vapor contact. Suitable internals for liquid vapor contact comprise trays or packing. Operating pressure for the column will usually be in a range of from 50 to 500 psig. The liquid stream 42 entering the top of the column 56 will usually have a temperature of about 5 to 15° F. lower than the temperature of the vapor stream. The contacting conditions within the absorption column are set to recover a hydrogen-rich stream of medium purity from the absorption column. For the purposes of this invention, "medium purity" will usually mean a purity of 85 to 95 mol % hydrogen. A purified gas stream passes from the top of adsorber column 56 and is withdrawn by line 14 for recovery after the aforementioned heat exchange in exchanger 12. A liquid hydrocarbon stream containing increased amounts of absorbed hydrocarbons passes out of adsorber column 56 via line 24 through heat exchanger 22 and into indirect heat exchange with the refrigerant in a heat exchanger 60. The liquid hydrocarbon stream 61 is recovered downstream of exchanger 60 after cooling of the refrigerant.

The drawing also shows other internal and external sources for the control stream. For example the control liquid hydrocarbon stream 20 may directly supply the control stream to heat exchange section 30 without heat exchange in exchanger 22 via lines 75, 77, 74 and 16. Temperature sensor 52 could then provide temperature control input in the manner previous described for valve 54 to a valve 76. The effluent from absorber column 56 may also supply the control stream directly from the absorber column via a line 78 and control valve 79, or after any desired amount of heat exchange such as downstream of a refrigerant heat exchanger 60 via a line 80 and a value 81. Any available external stream, such as a stabilized reformate stream of $C_5$ and higher hydrocarbons may be brought into the absorber arrangement to supply the control stream via a line 82 at a rate regulated by a control valve 83. It is further contemplated that any of these streams may be made available to supply alternative or combination control streams.

Compressed refrigerant for use in chiller 18 passes from compressor 46 via a line 62 through a water cooling stage in exchanger 64 before entering a receiver 66. Cooled refrigerant from receiver 66 may undergo any necessary drying (not shown) before passing to heat exchanger 60 via a line 68. Exchanger 60 subcools the refrigerant before entry into a flash economizer 70. An economizer stream 72 from flash economizer 70 flows back to compressor 46. The remainder of the refrigerant flows back to chiller 18 via line 34.

The hydrocarbon stream withdrawn from the absorption zone will differ from the first unstabilized liquid reformate in that the second will contain more $C_1+$ material transferred from the hydrogen-containing vapor phase. The hydrocarbon stream withdrawn from the absorption zone may be passed to a fractionation zone after being subjected to indirect heat exchange. By subjecting the hydrocarbon stream from the absorber to indirect heat exchange, it is thereby preheated prior to its passage to the fractionation zone. The indirect heat exchange step, therefore, results in supplementary energy savings by avoiding the necessity of heating the recovered hydrocarbon stream from the temperature at which the absorption zone is maintained prior to fractionation and also by reducing the refrigeration requirement of the system.

The hydrogen-rich gas stream withdrawn from the absorption zone will preferably have, depending on the conditions therein, a hydrogen purity in excess of 90 mol. %. After subjecting the hydrogen-rich gas stream to indirect heat exchange pursuant to the invention, the hydrogen-rich gas stream may then be passed to other hydrogen-consuming processes or may be utilized in any suitable fashion. It should be noted that by subjecting the hydrogen-rich gas stream to indirect heat exchange with the hydrogen-containing vapor phase, there accrues certain supplementary energy savings. Typically, the hydrogen-rich gas stream must undergo heating before it can be used in a hydrogen-consuming process. Accordingly, by subjecting the hydrogen-rich gas to indirect heat exchange and thereby warming it, energy savings will be achieved, avoiding the necessity of heating the hydrogen-rich gas stream from the temperature maintained in the absorption zone. Additionally, such a heat exchange step decreases the total refrigeration requirements further reducing the energy requirements of the system.

ILLUSTRATIVE EMBODIMENT

To more fully demonstrate the attendant advantages of the present invention, the following examples—based on thermodynamic analysis, engineering calculations, and estimates—are set forth. Details such as miscellaneous pumps, heaters, coolers, valving, start-up lines, and similar hardware have been omitted as being non-essential to a clear understanding of the techniques involved.

A reaction zone effluent is cooled to a temperature of about 100° F. and passed to a vapor-liquid equilibrium separation zone to produce a first hydrogen-containing vapor phase comprising 75 to 85 mol. % hydrogen and a first unstabilized liquid reformate. The first vapor-liquid separation zone operates at a temperature of about 100° F. and a pressure of about 50 to 500 psig. A hydrogen-containing vapor phase from the vapor-liquid equilibrium separation zone enters the refrigeration section via line 10 as depicted in the FIGURE. A first unstabilized liquid reformate phase from the vapor-liquid equilibrium separation zone comprising about 20 to 40 vol. % of the total unstabilized liquid reformate is diverted to line 20. The balance of the unstabilized liquid reformate is passed to fractionation facilities not depicted herein.

The hydrogen-containing vapor phase entering line 10 may be compressed as necessary to raise its pressure to the range of 50 to 500 psig and is passed to pre-cooling heat exchanger 12. In pre-cooling heat exchanger 12, the hydrogen-containing vapor phase is subjected to indirect heat exchange with a hydrogen-rich gas stream. This heat exchange step reduces the temperature of the hydrogen-containing vapor phase from about 100 to about 50° F. The pre-cooled portion of the hydrogen-containing vapor phase is then withdrawn from pre-cooling heat exchanger 12 via line 16.

The unstabilized liquid reformate is passed via line 20 to pre-cooling heat exchanger 22 and indirectly heat exchanged with an unstabilized liquid reformate stream 24 which reduces the temperature of the unstabilized liquid reformate stream 20 from about 100 to about 30° F. The pre-cooled unstabilized liquid reformate is withdrawn from pre-cooling heat exchanger 22 via line 26.

Both of the pre-cooled hydrogen-containing vapor phase and the pre-cooled liquid reformate streams are passed to the refrigeration section 18. About 1 to 10 wt. % of the liquid reformate steam is passed into line 50 and admixed with the hydrogen-containing vapor stream before the separate liquid and gas streams enter the heat exchange sections 38 and 32, respectively.

The cooled hydrogen-containing vapor stream withdrawn from refrigeration section 18 passes via line 48 into the bottom of absorber column 56. The cooled liquid reformate stream passes via line 42 into the top of absorber column 56 and contacts the cooled hydrogen-containing stream to produce a hydrogen-rich stream 14. Hydrogen-rich gas stream 14 passes through indirect heat exchanger 12 as it is recovered from the process. Unstabilized liquid reformate recovered from the bottom of absorber column 56 undergoes indirect heat exchange with the incoming liquid reformate stream and the condensed refrigerant before recovery via line 61.

What is claimed is:

1. A method for recovering liquifiable hydrocarbons from a gas stream by the chilling of said gas stream and a liquid stream and the absorption of said liquifiable hydrocarbons by the chilled liquid stream, said method comprising:

a) passing a liquid chiller feed comprising hydrocarbons to a liquid heat exchange section in a chiller having a single shell and indirectly contacting said chiller feed with a refrigerant in said chiller and chilling said chiller feed to produce an absorber liquid;

b) combining a gas stream comprising liquifiable hydrocarbons with a control stream comprising liquid phase hydrocarbons to produce a gaseous chiller feed;

c) passing said gaseous chiller feed to a gas heat exchange section in said chiller separately from said liquid chiller feed and indirectly contacting said gaseous chiller feed with said refrigerant in said chiller to chill said gaseous chiller feed and produce a chilled gaseous stream;

d) contacting said chilled gaseous stream and said absorber liquid in an absorber and recovering an absorber gas having a reduced quantity of liquifiable hydrocarbons relative to said gas stream and a liquid phase absorber effluent; and, e) adjusting the temperature of the chilled gas stream by varying the amount of said control stream that is combined with said gas stream.

2. The method of claim 1 wherein the temperature of said absorber liquid is controlled by adjusting the temperature of the refrigerant.

3. The method of claim 1 wherein said liquid chiller feed is indirectly heat exchanged with said liquid phase absorber effluent.

4. The method of claim 1 wherein a refrigerant is recovered from said chiller, compressed, condensed, and indirectly heat exchanged with said liquid phase absorber effluent.

5. The method of claim 1 wherein said gas stream is indirectly heat exchanged with said chilled gaseous stream.

6. The method of claim 1 wherein the mass flow of said control stream equals 1 to 25 wt % of said liquid chiller feed.

7. The method of claim 1 wherein said chilled gaseous stream is chilled to a temperature of from 45 to −20° F. and said absorber liquid is chilled to a temperature of from 45 to −20° F.

8. The method of claim 1 wherein the control stream comprises a stabilized reformate stream of $C_5$ hydrocarbons.

9. The method of claim 3 wherein the control stream is divided from the liquid chiller feed upstream of where the liquid chiller feed is indirectly heat exchanged with said liquid phase adsorber effluent.

10. The method of claim 1 wherein the control stream comprises a portion of the liquid phase adsorber effluent.

* * * * *